United States Patent
Tuomikoski

(10) Patent No.: US 8,485,368 B2
(45) Date of Patent: Jul. 16, 2013

(54) FEED DISTRIBUTION ARRANGEMENT IN A LIQUID TREATMENT SPACE

(75) Inventor: Pekka Tuomikoski, Rauma (FI)

(73) Assignee: Finnketju Invest Oy, Rauma (FI)

( * ) Notice: Subject to any disclaimer, the term of this patent is extended or adjusted under 35 U.S.C. 154(b) by 302 days.

(21) Appl. No.: 13/120,065

(22) PCT Filed: Jul. 29, 2009

(86) PCT No.: PCT/FI2009/050641
§ 371 (c)(1),
(2), (4) Date: Mar. 21, 2011

(87) PCT Pub. No.: WO2010/031898
PCT Pub. Date: Mar. 25, 2010

(65) Prior Publication Data
US 2011/0174729 A1    Jul. 21, 2011

(30) Foreign Application Priority Data
Sep. 19, 2008 (FI) .................................... 20085884

(51) Int. Cl.
*B01D 21/24* (2006.01)
(52) U.S. Cl.
CPC ........ *B01D 21/2422* (2013.01); *B01D 21/2427* (2013.01)
USPC ...................................... 210/519; 210/532.1
(58) Field of Classification Search
USPC ................ 210/519, 528, 532.1, 800, 801
See application file for complete search history.

(56) References Cited

U.S. PATENT DOCUMENTS

| | | | | | |
|---|---|---|---|---|---|
| 1,741,187 | A | * | 12/1929 | Fuqua | 210/519 |
| 2,355,305 | A | * | 8/1944 | Koenig | 210/519 |
| 3,291,316 | A | | 12/1966 | Kelly | |
| 4,038,186 | A | * | 7/1977 | Potter et al. | 210/519 |
| 4,406,789 | A | * | 9/1983 | Brignon | 210/519 |
| 5,075,001 | A | | 12/1991 | Taylor | |
| 5,458,777 | A | * | 10/1995 | Khatib | 210/519 |
| 5,637,234 | A | * | 6/1997 | McCasland | 210/801 |
| 6,276,537 | B1 | * | 8/2001 | Esler et al. | 210/519 |
| 7,021,471 | B2 | * | 4/2006 | Abrams | 210/519 |
| 7,666,303 | B2 | * | 2/2010 | Williams et al. | 210/519 |
| 7,927,490 | B2 | * | 4/2011 | Teichroeb et al. | 210/519 |

FOREIGN PATENT DOCUMENTS

| | | |
|---|---|---|
| CA | 873466 A | 6/1971 |
| EP | 0508047 A1 | 10/1992 |
| WO | WO-9819765 A1 | 5/1998 |

OTHER PUBLICATIONS

PCT/ISA/210—International Search Report Dec. 30, 2009.
PCT/ISA/237—Written Opinion of the International Searching Authority—Dec. 30, 2009.

* cited by examiner

*Primary Examiner* — Christopher Upton
(74) *Attorney, Agent, or Firm* — Venable LLP; Eric J. Franklin

(57) ABSTRACT

An arrangement in a liquid treatment space clarifying liquid by gravity. A feed assembly leads the liquid to be treated into the treatment space by a fixed distribution channel. The feed assembly includes at least two elongated and in a longitudinal direction thereof straight feed channels being fixed stationary in the distribution channel and extending therefrom sidewards, in order to achieve in the treatment space a radially widened feed zone in respect with the distribution channel by an efflux assembly provided with the feed channels the efflux assembly discharging the liquid to be treated into the treatment space through full length thereof.

15 Claims, 4 Drawing Sheets

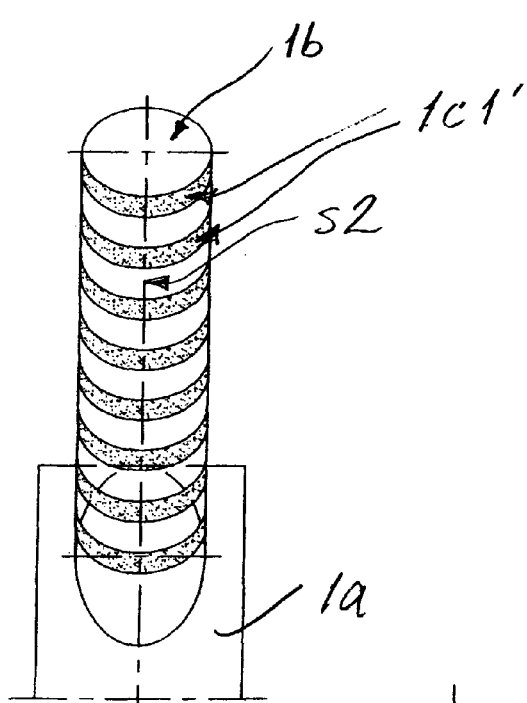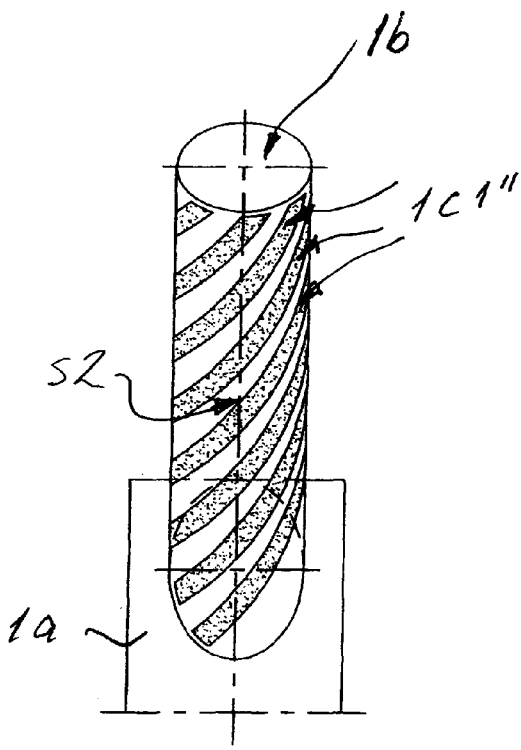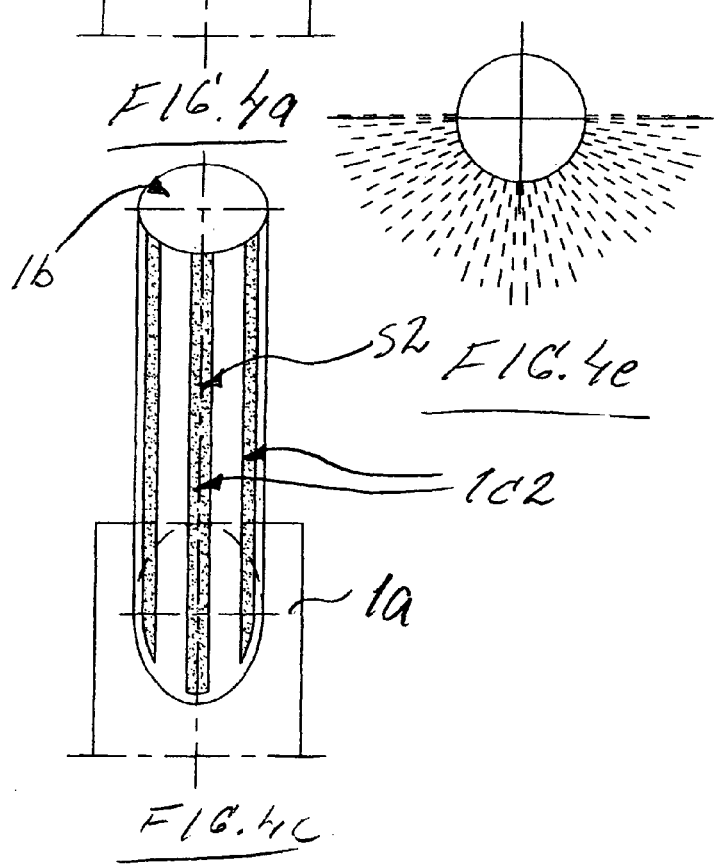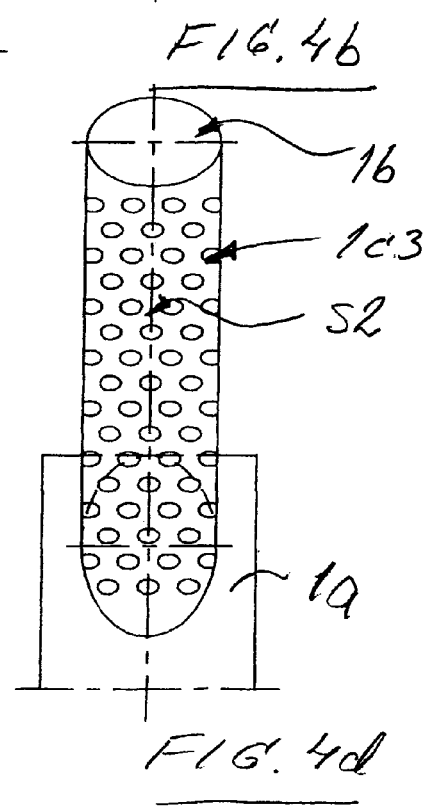
FIG. 4a
FIG. 4b
FIG. 4e
FIG. 4c
FIG. 4d

FEED DISTRIBUTION ARRANGEMENT IN A LIQUID TREATMENT SPACE

CROSS-REFERENCE TO RELATED APPLICATIONS

This application claims priority to Finnish patent application 20085884 filed 19 Sep. 2009 and is the national phase of PCT/FI2009/050641 filed 19 Sep. 2008.

FIELD OF THE INVENTION

The invention relates to an arrangement in a liquid treatment space, such as in a clarification basin or like clarifying liquid, the arrangement consisting at least of a feed assembly for leading of the liquid to be treated, such as waste water or like, into the treatment space by a fixed distribution channel being led therein.

BACKGROUND OF THE INVENTION

For the purpose described above it is nowadays known to exploit most heterogeneous arrangements particularly in order to carry out processes taking place in connection with a clarification. Furthermore it is known to use most heterogeneous tank shapes, such as rectangular or circular shaped basins e.g. as so called horizontal or vertical clarification tanks, the depths of which also vary greatly. In bringing of the liquid to be treated in the process into the treatment space, the most usual implementation being nowadays probably such that the liquid to be treated is being brought into the tank in a centrical manner from one point by a fixed distribution channel or in other words e.g. in a rectangular tank horizontally through one of its sidewalls or in a tank having a circular cross section vertically from above or from below through its center by distributing it e.g. horizontally.

There are very many problems and drawbacks involved with those traditional arrangements described above, because feeding of the liquid to be treated in a centrical manner from one point of the tank causes first of all non-homogeneity in the tank,, which significantly slows down occurring of the clarification process taking place.

On the other hand, it is also known to use movable arrangements in order to feed the liquid to be treated in a wider area in the treatment space, which solutions, however, bring about significant investment costs as well as a remarkable need for service and maintenance. Furthermore, moving mechanisms are susceptible to all kinds of operational disturbances particularly in the type of operational use as described above.

SUMMARY OF THE INVENTION

It is an aim of the present arrangement to achieve a decisive improvement in the problems described above and thus to raise essentially the level of prior art. In order to carry out this aim, the arrangement in a liquid treatment space according to the .present invention is mainly characterized in that the feed assembly comprises as least two elongated and in a longitudinal direction thereof straight feed channels being fixed stationarily in the distribution channel and extending therefrom sidewards, in order to achieve in the treatment space a radially widened feed zone in respect with the distribution channel by means of an efflux assembly provided with the feed channels, such as flow openings, nozzles and/or like, that discharge the liquid to be treated into the treatment space through full length thereof.

As the most important advantages of the arrangement according to the invention may be mentioned its simplicity and reliability, whereby with very simple constructions a process entirety can be achieved that operates both technically and economically significantly better than corresponding present ones and the manufacturing costs of which are most profitable thanks to the feed channels that are straight in the longitudinal direction thereof. By virtue of the arrangement according to the invention it is possible to make sure optimum operating conditions for each liquid treatment process at any given'time as well as a minimum need for service thereof thanks to the totally fixed and integrated feed assembly, which, however, is capable of discharging liquid to be treated into the treatment space more evenly by virtue of the feed zones, being most advantageously widened both horizontally and vertically. The feed assembly carried out according to the invention may be implemented totally below the liquid surface, in which case also e.g. freezing problems can be avoided. By feeding the liquid to be treated in the treatment space such as waste water essentially in an obliquely downward direction in a jet-like manner through the flow openings in the feed channel, drifting thereof on the surface to form surface scum can be avoided, which can take place when the liquid to be treated is being fed e.g. upwards at the center of the treatment space and distributed ahead horizontally. By the arrangement according to the invention it is thus possible to significantly homogenize a liquid in a treatment space or e.g. in a clarification basin, in which case the actual clarification process may take place significantly more efficiently than in corresponding present arrangements.

BRIEF DESCRIPTION OF THE DRAWINGS

In the following description, the invention is being illustrated in detail with reference to the appended drawings, in which in FIG. 1 is shown one advantageous arrangement according to the invention, being used in a so called horizontal clarification tank, in FIG. 2 are shown as examples two alternative implementations of a feed assembly belonging to the arrangement according to the invention.

DETAILED DESCRIPTION OF EMBODIMENTS OF THE INVENTION

The invention relates to an arrangement in a liquid treatment space, such as in a clarification basin or like clarifying liquid by gravitation, the arrangement consisting at least of a feed assembly 1 for leading of the liquid to be treated, such as waste water or like, into the treatment space K by a fixed distribution channel 1a being led therein. The feed assembly comprises at least two elongated and in a longitudinal direction s2 thereof straight feed channels 1b being fixed stationarily in the distribution channel 1a and extending therefrom sidewards, in order to achieve in the treatment space K a radially widened feed zone z1 in respect with the distribution channel 1a e.g. on the principle shown in FIGS. 1 and 3 by means of an efflux assembly 1c provided with the feed channels, such as flow openings 1c1, nozzles and/or like, the efflux assembly discharging the liquid to be treated into the treatment space through full length thereof.

Figure 1:
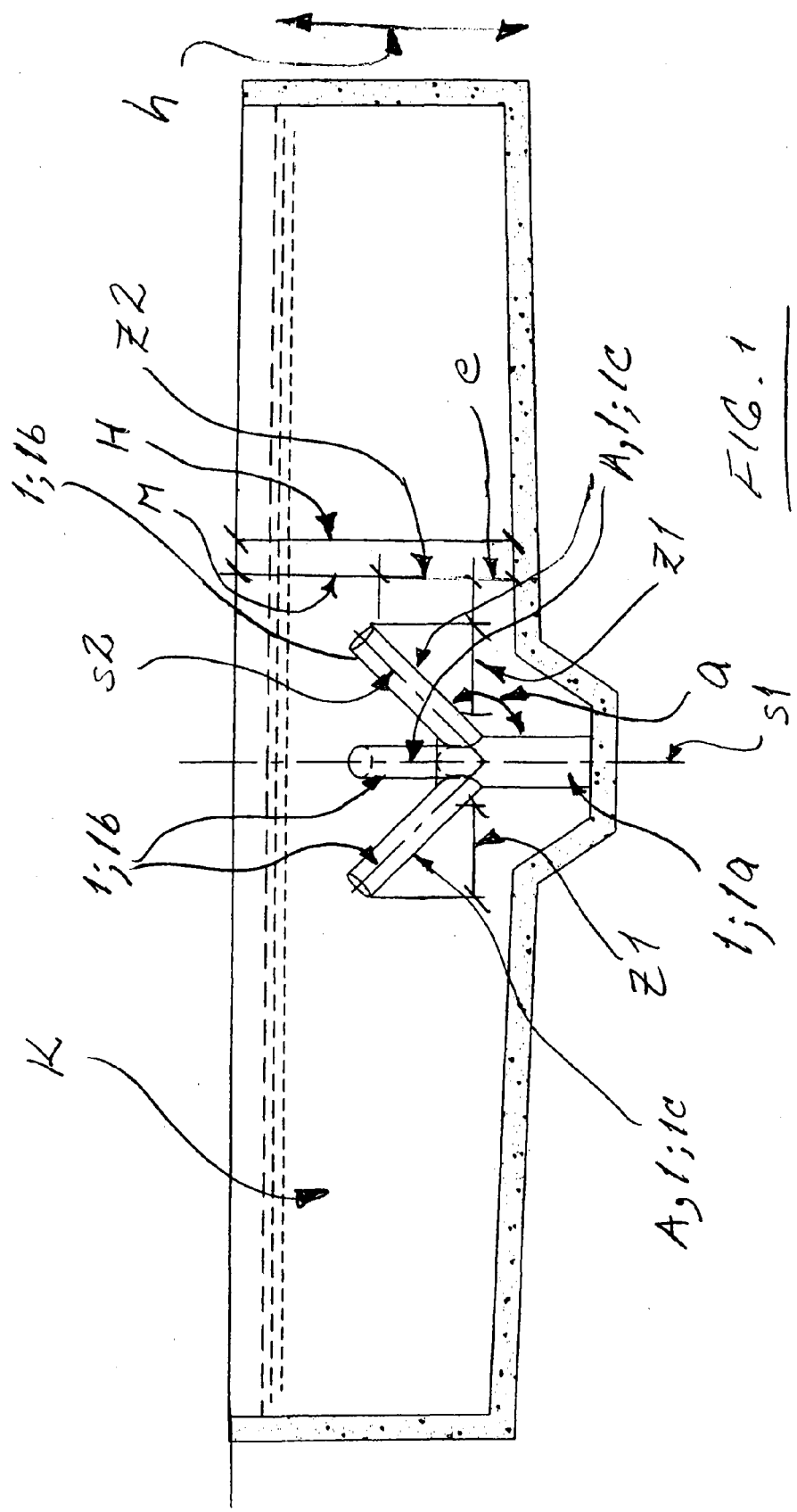
Figure 3:
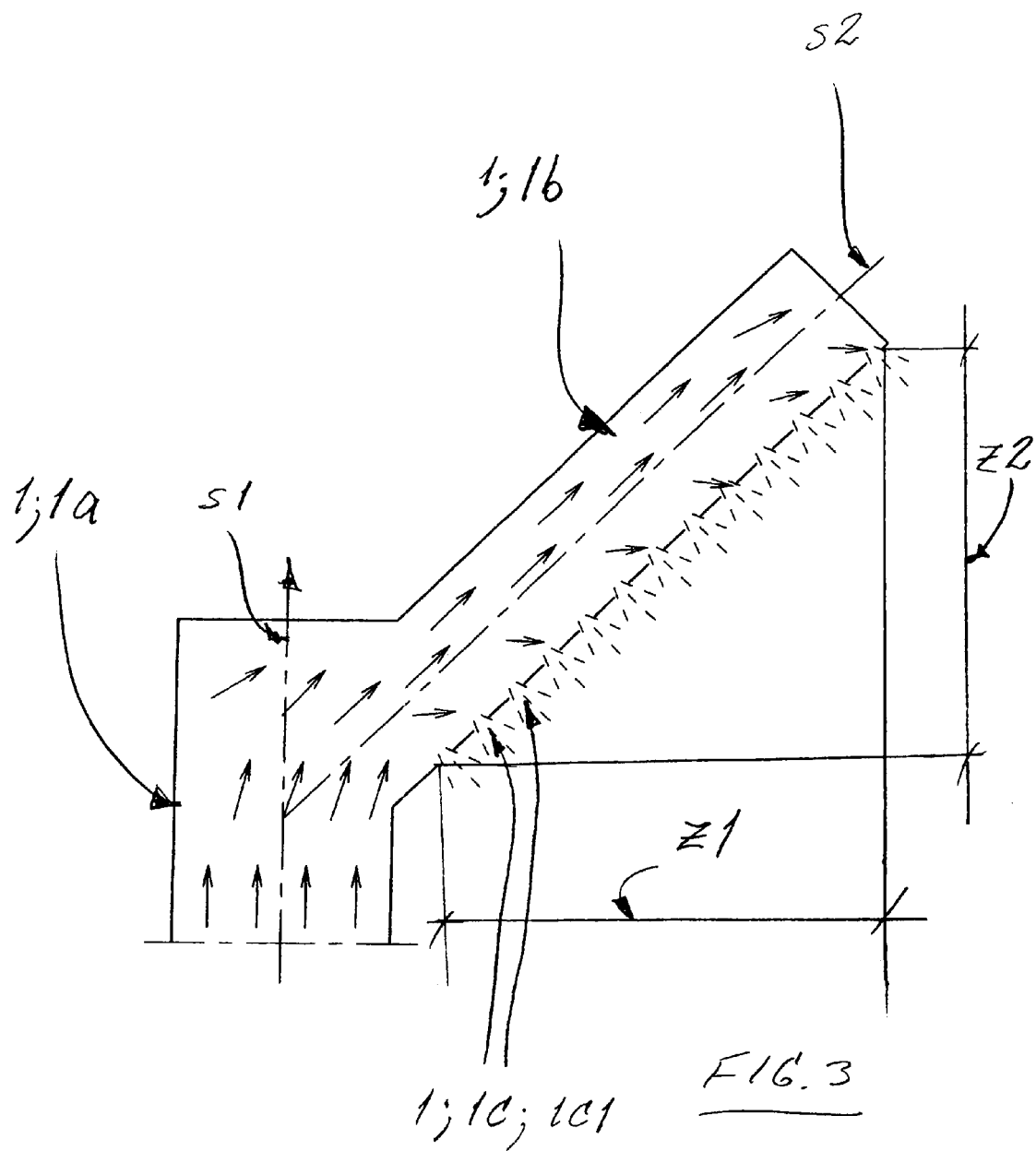
in FIG. 3 is shown a flow taking place in a feed channel of the feed assembly and in FIGS. 4a-4e are shown alternative efflux assemblies (4a-4d) of the feed channel belonging to the arrangement according to the invention, and an efflux (FIG. 4e) that takes place therefrom when viewed by the end of the feed channel.

Particularly with reference to the advantageous embodiment of the arrangement according to the invention, shown in FIG. 1, at an end of the distribution channel 1a, at a distance e from a bottom of the treatment space K there are coupled feed channels 1b, such as pipes, box beams or like, being joined therewith when viewed in a direction of height h in an obtuse angle a, whereby the efflux assembly 1c is arranged on lower surfaces A thereof, in order to achieve in the treatment space K also a feed zone z2 in the direction of height h on the principle shown particularly in FIG. 3.

In the advantageous embodiment shown in FIG. 1, the feed assembly 1 comprises a distribution channel 1a that is led from below into a treatment space K, having a circular cross section, and that is placed essentially at the center part of the treatment space. A cross-sectional total area of the feed channels 1b, being coupled stationarily with the distribution channel 1a, is essentially greater than the cross-sectional flow area of the distribution channel 1a particularly in order to decrease a flow rate of the liquid to be treated before the efflux assembly 1c.

Figure 2:
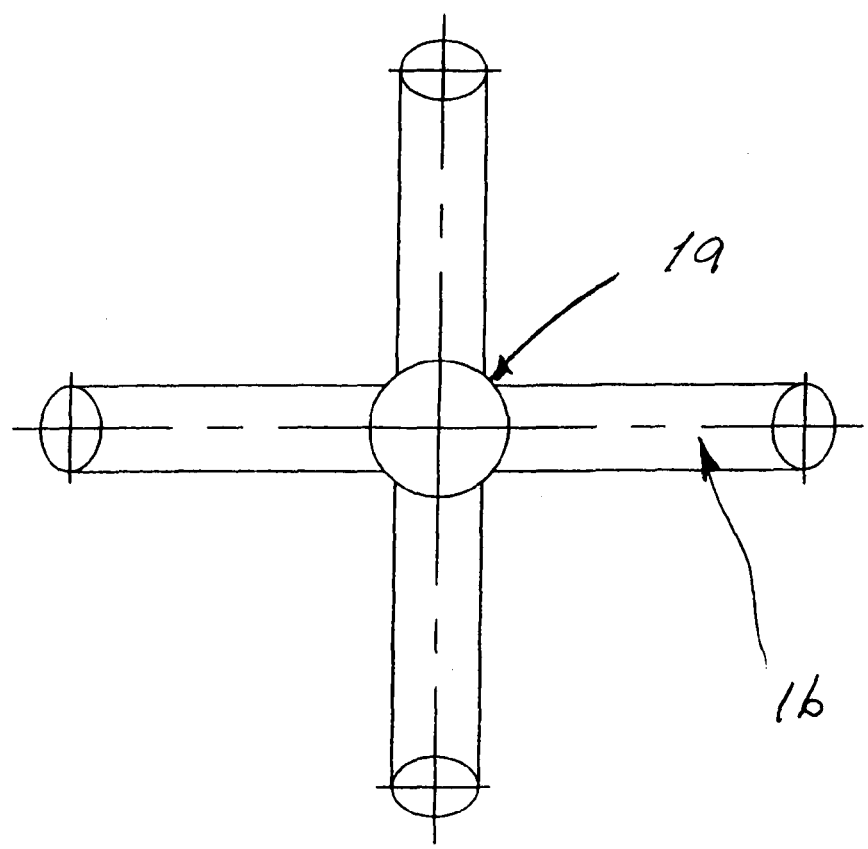
Figure 2:
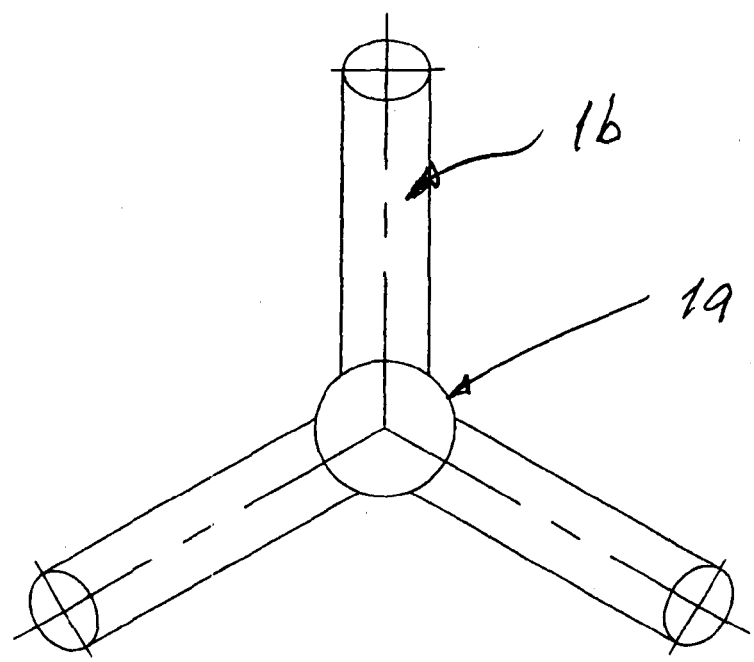

Furthermore as an advantageous embodiment particularly with reference to FIGS. 1 and 2, the feed assembly 1 comprises at least three feed channels 1b, being coupled with the distribution channel 1a symmetrically, when viewed in a cross section perpendicular, to its longitudinal direction s1.

Furthermore as an advantageous embodiment particularly with reference to FIGS. 4a and 4b, the efflux assembly 1c comprises flow openings 1c1', 1c1" in the feed channels 1b, the openings being at a distance from each other in a longitudinal direction s2 of the feed channels 1b and elongated in a transverse direction and/or partly in the longitudinal direction s2.

Furthermore as an advantageous embodiment with respect to the alternative implementation shown in FIG. 4, the efflux assembly 1c comprises flow openings 1c2 in the feed channels 1b, the openings being elongated in the longitudinal direction s2 thereof. The efflux assembly 1c may also comprise as shown in FIG. 4d a perforation 1c3 in the feed channels that continues in the longitudinal direction s2 thereof.

Naturally depending on the dimensions of the treatment space K, the length of the feed channels 1b is advantageously between 1.5-3 meters, a minimum cross sectional flow dimension thereof between 60-100 mm and/or a minimum dimension of the flow openings 1c1', 1c1", 1c2, 1c3 therein 60-100 mm. With the dimensions above it is possible to carry out as homogeneous as possible supply of liquid to be treated into the treatments space, in which case flow of the liquid to be treated takes place advantageously on the principle shown in FIG. 4e from the feed channel as a laminar flow from below, whereby by guiding the liquid to be treated advantageously in a jet-like manner downwards in an obtuse angle it can be efficiently spread in a wider area in the treatment space than in traditional solutions, however, without causing turbulence for e.g. a clarification process taking place in the treatment space.

In the present embodiment, the efflux assembly is carried out by flow openings, but in this context it is naturally also possible to use suitable nozzle assemblies, which, however, in practice increase manufacturing costs when compared to the type of flow opening implementations described above.

Furthermore as an advantageous embodiment, a height of the feed zone z2 in the direction of height is 20-60%, advantageously approximately 40% of a liquid space height H of the treatment space. Correspondingly with reference to FIG. 1, as an advantageous embodiment, a distance M between an upper edge of the treatment space and an uppermost flow item of the efflux assembly 1c is profitably at least 30-60%, advantageously approximately 40% of the liquid space height H of the treatment space.

It is clear that the invention is not limited to the embodiments shown or described above, but instead it can be modified within the basic idea of the invention in most heterogeneous ways. Thus it is first of all clear that the feed channels can have e.g. mutually deviating lengths or there may exist a larger amount of feed channels than presented in the embodiments described above. It is also possible to exploit certain kinds of flow guiding surfaces e.g. at the ends of the feed channels or flow throttle assemblies in connection with the flow openings or nozzles existing therein.

The invention claimed is:

1. An arrangement in a liquid treatment space clarifying liquid by gravity, the arrangement comprising:
a feed assembly for leading the liquid to be treated into the treatment space by a fixed distribution channel being led therein, wherein the feed assembly comprises at least two elongated and in a longitudinal direction thereof straight feed channels being fixed stationarily in the distribution channel and extending therefrom sidewards, in order to achieve in the treatment space a radially widened feed zone in respect with the distribution channel by an efflux assembly provided with the feed channels, the efflux assembly discharging the liquid to be treated into the treatment space through full length thereof, wherein at an end of the distribution channel, at a distance from a bottom of the treatment space there are coupled feed channels being joined therewith when viewed in a direction of height in an obtuse angle in an obliquely upward position, whereby the efflux assembly is arranged on lower surfaces thereof, in order to achieve a feed zone in the direction of height in the treatment space.

2. The arrangement according to claim 1, wherein the feed assembly comprises a distribution channel, being led from below into a treatment space, having a circular cross section, the feed assembly being placed essentially at a center part thereof, wherein a cross-sectional total area of the feed channels, being coupled stationarily with the distribution channel, is essentially greater than the cross-sectional flow area of the distribution channel particularly in order to decrease a flow rate of the liquid to be treated before the efflux assembly.

3. The arrangement according to claim 1, wherein the feed assembly comprises at least three feed channels, being coupled with the distribution channel symmetrically, when viewed in a cross section perpendicular to its longitudinal direction.

4. The arrangement according to claim 1, wherein the efflux assembly comprises flow openings in the feed channels, the openings being at a distance from each other in a longitudinal direction of the feed channels and elongated in at least one of a transverse direction or partly in the longitudinal direction.

5. The arrangement according to claim 1, wherein the efflux assembly comprises flow openings in the feed channels, the openings being elongated in the longitudinal direction thereof.

6. The arrangement according to claim 1, wherein the efflux assembly comprises a perforation in the feed channels that continues in the longitudinal direction thereof.

7. The arrangement according to claim 1, wherein a length of the feed channels is between 1,5-3 meters, a minimum cross sectional flow dimension thereof being between 60-100 mm and/or a minimum dimension of the flow openings therein being 60-100 mm.

8. The arrangement according to claim 1, wherein a height of the feed zone in the direction of height is 20-60%, of a liquid space height of the treatment space.

9. The arrangement according to claim 1, wherein a distance between an upper edge of the treatment space and an uppermost flow item of the efflux assembly is at least 30-60% of a liquid space height of the treatment space.

10. The arrangement according to claim 1, wherein the liquid treatment space comprises a clarification basin.

11. The arrangement according to claim 1, wherein the liquid to be treated comprises waste water.

12. The arrangement according to claim 1, wherein the feed channels comprise at least one of flow openings or nozzles.

13. The arrangement according to claim 1, wherein the feed channels comprise pipes or box beams.

14. The arrangement according to claim 1, wherein a height of the feed zone in the direction of height is 40% of a liquid space height of the treatment space.

15. The arrangement according to claim 1, wherein a distance between an upper edge of the treatment space and an uppermost flow item of the efflux assembly is at least at least 40% of a liquid space height of the treatment space.

* * * * *